United States Patent
Lang et al.

(10) Patent No.: US 11,034,239 B2
(45) Date of Patent: Jun. 15, 2021

(54) SYSTEM AND METHOD FOR DYNAMIC ADJUSTMENT OF A LEAD OF AN AXLE OF A VEHICLE

(71) Applicant: DEERE & COMPANY, Moline, IL (US)

(72) Inventors: Matthias Lang, Mannheim (DE); Rainer Gugel, Plankstadt (DE); David Mueller, Stutensee (DE)

(73) Assignee: DEERE & COMPANY, Moline, IL (US)

( * ) Notice: Subject to any disclaimer, the term of this patent is extended or adjusted under 35 U.S.C. 154(b) by 336 days.

(21) Appl. No.: 16/213,193

(22) Filed: Dec. 7, 2018

(65) Prior Publication Data
US 2019/0225079 A1    Jul. 25, 2019

(30) Foreign Application Priority Data
Jan. 22, 2018   (DE) .......................... 102018200953.8

(51) Int. Cl.
*B60K 23/08*    (2006.01)
*B60K 17/346*   (2006.01)
*B60K 17/356*   (2006.01)
*B60K 17/35*    (2006.01)
*B60K 17/348*   (2006.01)

(52) U.S. Cl.
CPC ........ *B60K 23/0808* (2013.01); *B60K 17/348* (2013.01); *B60K 17/3462* (2013.01); *B60K 17/35* (2013.01); *B60K 17/356* (2013.01)

(58) Field of Classification Search
None
See application file for complete search history.

(56) References Cited

U.S. PATENT DOCUMENTS 5,947,855 A * 9/1999 Weiss ...................... B60K 6/52
                                                    475/5

FOREIGN PATENT DOCUMENTS

| DE | 4108647 A1 | 9/1992 | |
| DE | 102005044181 A1 | 4/2007 | |
| DE | 102013021224 A1 * | 8/2014 | ............... B60K 6/48 |
| DE | 102013021224 A1 | 8/2014 | |
| DE | 102013224383 A1 * | 5/2015 | ............. B60K 17/34 |
| DE | 102013224383 A1 | 5/2015 | |
| DE | 102013226592 A1 | 6/2015 | |
| DE | 102015209244 A1 | 11/2016 | |
| DE | 102015114055 A1 | 3/2017 | |

OTHER PUBLICATIONS

European Search Report issued in counterpart application No. 19152565.8 dated May 29, 2019. (8 pages).

* cited by examiner

*Primary Examiner* — Kevin Hurley

(57) ABSTRACT

A vehicle, system, and method for dynamic adjustment of a lead of an axle of a vehicle having a combustion engine for all-wheel drive of a front axle and a rear axle is provided. The system includes an electric motor and a summing gear configured to sum a drive power of the combustion engine and the electric motor. The summing gear has at least two gear elements. The at least two gear elements are magnetically coupled.

20 Claims, 3 Drawing Sheets

SYSTEM AND METHOD FOR DYNAMIC ADJUSTMENT OF A LEAD OF AN AXLE OF A VEHICLE

RELATED APPLICATION

This application claims priority under 35 U.S.C. § 119 to German patent application DE 102018200953.8, filed Jan. 22, 2018, the disclosure of which is incorporated herein by reference in its entirety.

BACKGROUND

The currently most common traditional variation of an all-wheel drive according to the prior art consists of a combustion engine, whose power is distributed to a plurality of axles and wheels. Traditional all-wheel drives can be divided into two basic types.

The first traditional basic type consists of differential-controlled or full-time all-wheel drives. They have a central differential (also called a longitudinal differential or a middle differential), which distributes the drive power full-time to both axles and is sometimes designed as a locking differential. The central differential in traditional variations according to the prior art is often a planetary gear, occasionally also designed as a differential, since it is a special planetary transmission with a 50:50 torque distribution. Alternatively, differentials without gearing, for example slide locking differentials, can also be used.

The second traditional basic type in the prior art consists of clutch-controlled all-wheel drives. In these systems, one axle is driven full-time, but the other axle is provided with drive power via a clutch only under specific conditions. The clutch itself can be a simple jaw clutch, a viscous coupling, a centrifugal clutch, or an electronically controlled friction plate clutch.

With vehicles that have full-time all-wheel drive, the engine power is continuously transmitted to all four wheels and complete balancing of rotary speed without losses of power is ensured by the differentials. To avoid stresses in the drive train, an additional central differential is often built-in between the front and rear axles. However, the disadvantage here is that if an individual wheel or an axle lacks traction, the drive torque that can be transmitted through the wheel or the axle becomes limited, so that in an extreme case a vehicle can no longer be moved on its own power. Often in the case of vehicles with full-time all-wheel drive, either the central differential is designed as a locking differential or electronic traction aids are used because of this.

SUMMARY

Various aspects of embodiments of the present disclosure are set out in the claims.

In accordance with an embodiment of the present disclosure, a system for dynamic adjustment of a lead of an axle of a vehicle having a combustion engine for all-wheel drive of a front axle and a rear axle is provided. The system includes an electric motor and a summing gear configured to sum a drive power of the combustion engine and the electric motor. The summing gear has at least two gear elements. The at least two gear elements are magnetically coupled.

In accordance with an embodiment of the present disclosure, a method of dynamically adjusting a lead of an axle of a vehicle having a combustion engine for all-wheel drive of a front axle and a rear axle is provided. The method includes providing an electric motor and a summing gear having at least two gear elements, magnetically coupling the at least two gear elements of the summing gear, and summing a drive power of the combustion engine and the electric motor with the summing gear.

In accordance with an embodiment of the present disclosure, a vehicle includes a front axle, a rear axle, a combustion engine for all-wheel drive of the front axle and the rear axle, an electric motor, and a summing gear configured to sum a drive power of the combustion engine and the electric motor. The summing gear has at least two magnetically coupled gear elements for dynamic adjustment of a lead of one of the front axle and the rear axle of the vehicle.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
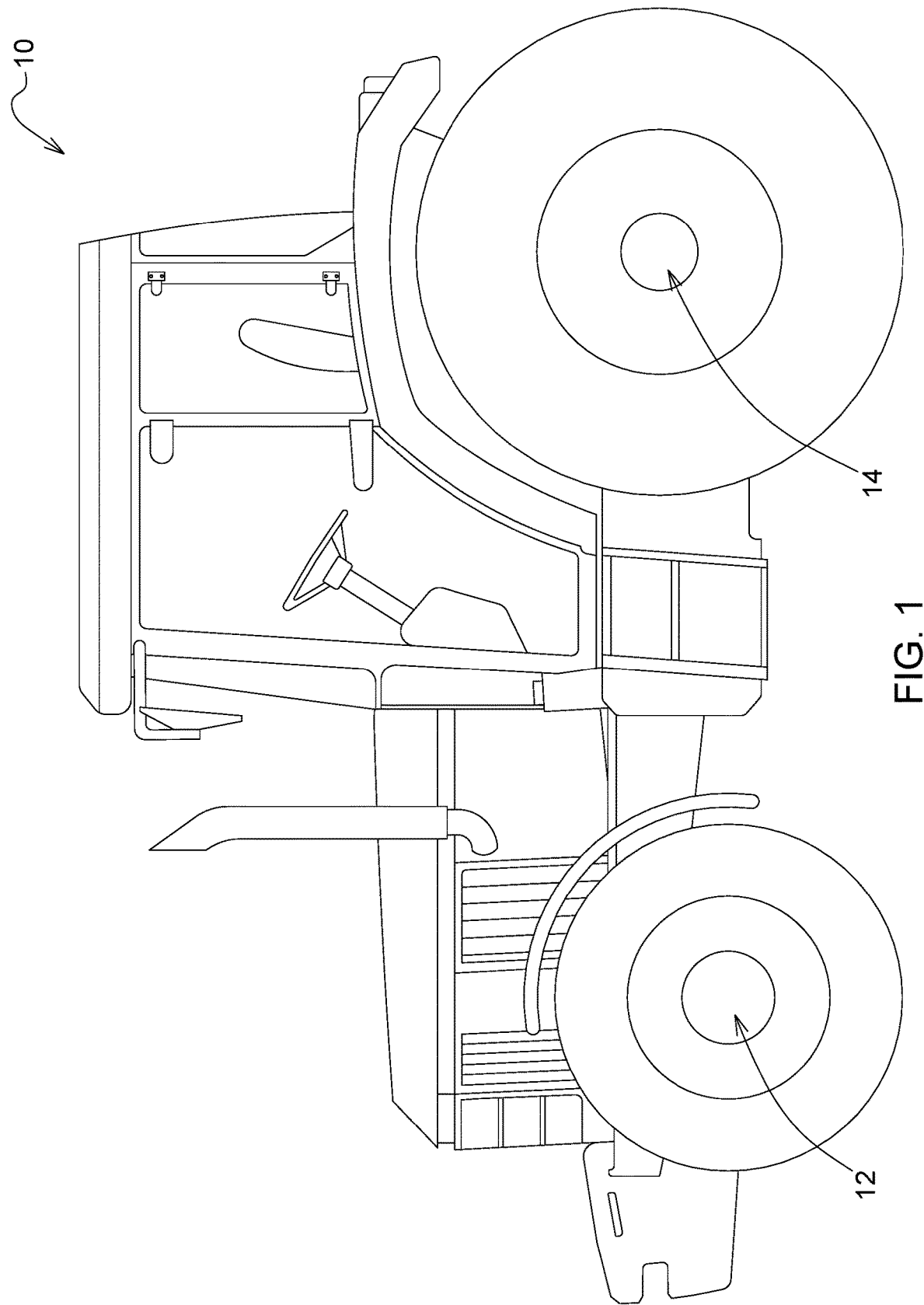
FIG. 1 illustrates a vehicle in accordance with an embodiment of the present disclosure.
Figure 2:
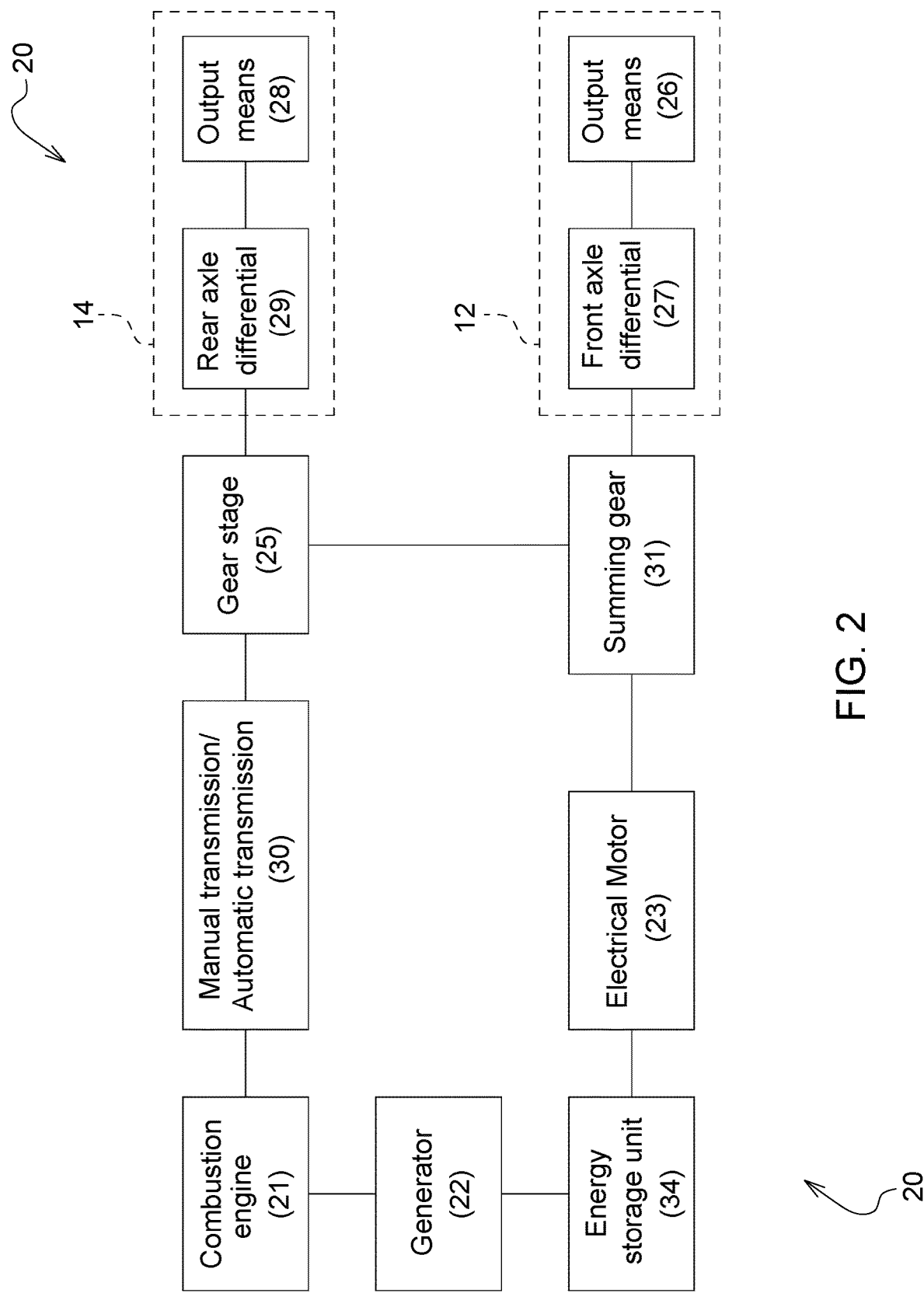
FIG. 2 is a schematic representation of a drive train with a system for dynamic adjustment of a lead in accordance with an embodiment of the present disclosure.
Figure 3:
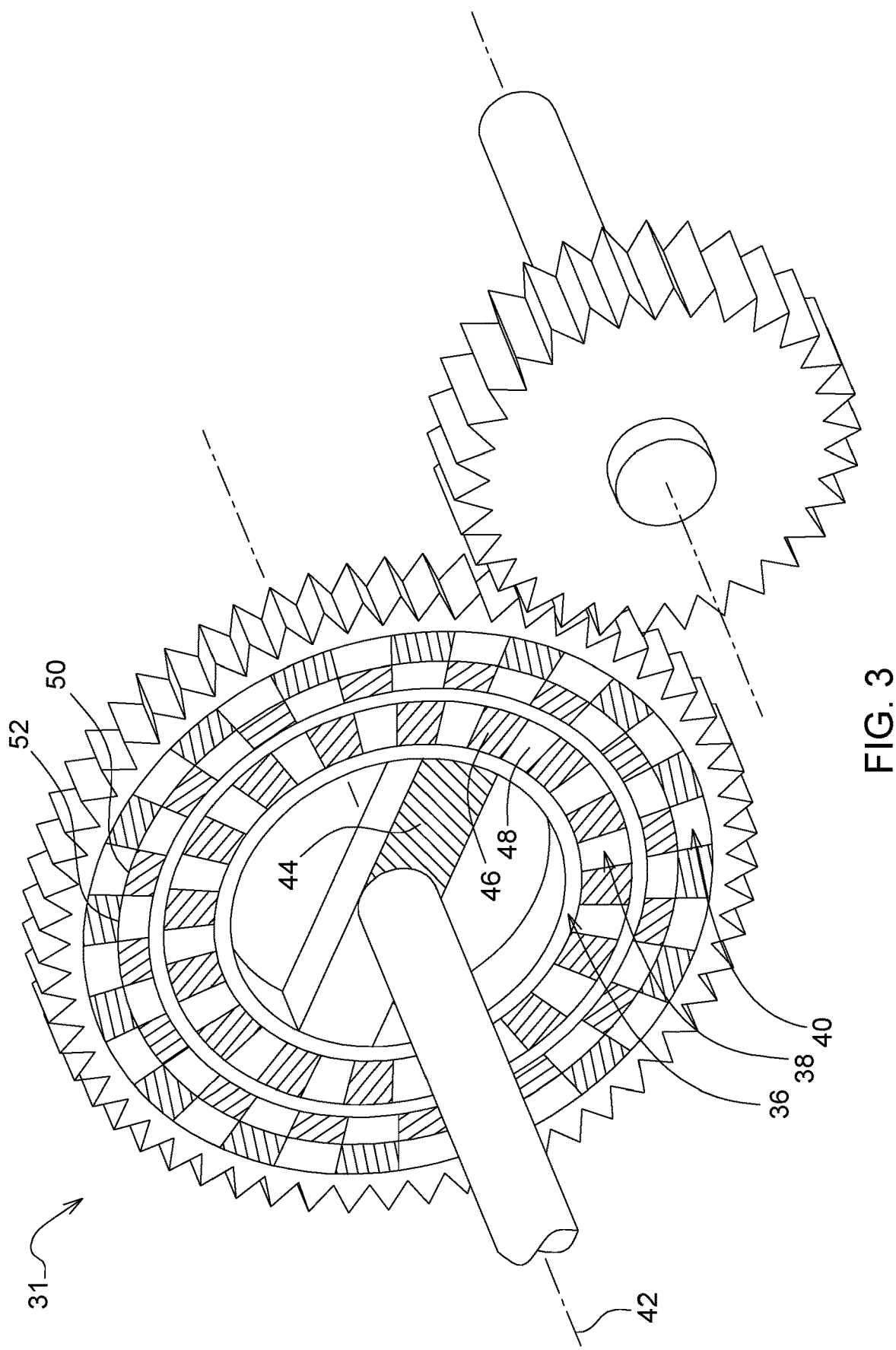
FIG. 3 is a schematic representation of a magnetic summing gearbox in accordance with an embodiment of the present disclosure.

At least one embodiment of the subject matter of this disclosure is understood by referring to FIGS. 1 through 3 of the drawings.

The present disclosure concerns an agricultural vehicle with a combustion engine for all-wheel drive of a front axle and a rear axle, wherein the vehicle has a system for dynamic adjustment of the lead.

Through the design of a central differential, the drive torque can be distributed evenly (50:50) or unevenly to two axles. The choice of distribution significantly determines the driving behavior. Since weight is additionally transferred to the rear axle on upgrades and while accelerating due to the dynamic axle load shift, it is also conventional to transfer a higher fraction of the drive torque to the rear axle. This is why in many vehicles the torque distribution between the front axle and rear axle is selected to be from 45:55 (F:R) to 33:67. This distribution is indeed initially fixed, but becomes extended by the locking of the central differential. In the case of a central differential with electronic friction plate coupling, power distributions of even 100:0 and 0:100 can be set due to external factors.

The torque is transmitted by a driveshaft to a main transmission, which is connected to a differential by an output shaft. The differential distributes the torque available to drive one or both vehicle axles to them. A transmission to set a torque and/or rotary speed ratio between the driven vehicle axles is disposed between the differential and the first vehicle axle.

Rigid coupling of the drive axles in the case of all-wheel drive agricultural vehicles, for example tractors with Ackermann steering, will lead to unfavorable driving behavior when traveling around curves. The higher speed of the front wheels in cornering due to the larger turning radius of the front axles is particularly problematic with the almost exclusively used Ackermann steering. Solutions need to be found particularly in the case of tractors, with the relatively small wheel spacing and the maneuverability that is indispensable for various operations.

The ratio of the average circumferential wheel velocity of the front and rear wheels is a conventional measure for describing the rolling kinematics. For a ratio greater than 1, one usually speaks of lead or overspeed of the front wheels. The lead requirement in cornering can be estimated. For example, using deflection characteristic curves of the tires in a computer model, the range for the practically relevant static lead can be determined.

Because of the required maneuverability, the turning angles have been increased up to 50 degrees, with ever more refined external drive linkages. At the maximum turning angles, the front wheels rotate almost 30% faster than the rear wheels. In the case of rigid all-wheel drives, impermissibly high reactive torques with reduced tractive power and increased wear arise at this rotary speed difference.

There is the possibility of manual or automatic disconnection of the front-wheel drive when traveling around tight curves. In this case, there is a corresponding decrease in the available tractive power of the front axle.

An adjustment of the front axle speed when cornering in which the front axle is driven with a certain transmission ratio via an engaged jaw clutch when traveling on a straight line and at smaller steering angles is known. At larger steering angles over 40 degrees, the jaw clutch is disengaged and a plate clutch is engaged, which now drives the front wheels faster via a higher transmission ratio.

One may change the transmission ratio to the front axle completely automatically. It is disadvantageous with this solution that the exact rotary speed adjustment of the front axle when cornering is carried out only at two design points. In the other regions, reduced, but still significant, reactive torques are generated.

One may set the correct rotary speed of the front wheels for all curve radii and slippage conditions optimally through the use of a hydrostatic transfer case.

DE 10 2015 114 055 A1 describes an agricultural vehicle having a combustion engine, which transmits a torque to a main transmission by means of a drive shaft. The main transmission is connected to a differential via an output shaft. The differential distributes the torque for driving one or both vehicle axles. A gearbox for setting a torque and/or rotary speed ratio between the driven vehicle axles is disposed between the differential and the first vehicle axle. The gearbox is designed as a continuously variable transmission.

DE 10 2005 044 181 A1 discloses a drive system for a tractor. The drive system comprises at least one electric generator, and a first and second electric motor. An electric generator is driven by a torque generated by an engine. One of the two electric motors is driven with the electric energy generated by the electric generator. The mechanical torque generated by the first and/or the second electric motor can be transferred to at least one drive axle of the vehicle to move it forward. In an embodiment, one drive axle can only be driven by one electric motor and another drive axle can only be driven by the other electric motor. Through this, the wheels of the front axle can be driven with a different circumferential wheel velocity than the wheels of the rear axle. The turning circle of the radius can be reduced by an increase of the lead of the wheels on the front axle.

DE 10 2013 224 383 A1 describes a split power axle drive. It comprises a primary drive element, two additional drive elements, two vehicle axles, and a main transmission. A split power axle drive has a split power transmission. An additional drive element affects the branched power transmission. The lead of the second vehicle axle can be controlled through this.

DE 2015 209 244 A1 describes a method in which, by loading the synchronously set rotary speed with a predefined difference correction factor, the set rotary speed of a second axle can be specifically set relative to the actual rotary speed of the first axle.

DE 2013 226 592 A1 concerns a method for reducing the lead by means of a tire pressure control system. Here, the air pressure of the front axle is reduced and the air pressure of the rear axle is increased. The lead can be reduced in this way by the translatory speeds of the wheels at the first axle and at the second axle being matched to each other by adjusting the wheel diameters.

The aim of the present disclosure is to develop an agricultural vehicle having an all-wheel drive.

According to the present disclosure, the vehicle has a system for dynamic adjustment of the lead of one axle. The possibility of a dynamic adjustment during vehicle operation brings considerable advantages over traditional vehicles with a rigid transmission behavior. It is possible to drive the front axle in a flexible way with a different rotary speed than the rear axle. Through a different rotary speed, the behavior on a curve can be actively influenced so that a smaller curve radius can be maintained. The vehicle according to the present disclosure also makes it possible that no lead is present, for example, in straight-line travel, and a lead is only present when cornering.

According to the present disclosure, a magnetic summing gearbox is used for dynamic adjustment of the slip. Such a magnetic summing gearbox is disclosed in, for example, DE 10 2013 021 224 A1. The use of such a magnetic summing gearbox for dynamic setting of the lead has great advantages over the use of mechanical summing gearboxes, for example. Mechanical transfer cases that satisfy this function had to achieve very high transmission ratios as well as implement safety devices to protect against overspeed on fast tight curves, which leads to very high design expenditures and thus high costs. On the other hand, the magnetic summing gearbox can realize high transmission ratios in one step and has inherent safety against overload, for example against an overspeed, which does not require any switchable separable connection that may be additionally implemented in the design.

In the summing gearbox, at least two gear elements are magnetically coupled to each other. In a variation of the present disclosure, a third gear element is likewise magnetically coupled to at least one of the two other gear elements.

Torque is transferred between the gear elements via magnetic fields. In this case, a rotating magnetic field is generated by a rotation of a gear element and then exerts a force on another gear element. Torque is transferred contact-free in the summing gearbox.

In one variation of the present disclosure, the first gear element is designed as an inner ring. It comprises magnetic elements, which may be made as permanent magnets. The magnets may be aligned at a right angle to the main axis of rotation of the summing gearbox.

It turns out to be particularly favorable if the second gear element is designed as a middle ring. In this case, the second gear element designed as a middle ring surrounds the first gear element, which is designed as an inner ring. The second gear element comprises magnetically conductive elements and magnetically nonconductive elements, which are each arranged alternately.

In an advantageous variation of the present disclosure, the third gear element is designed as an outer ring. The gear element designed as an outer ring is disposed radially outside the second gear element, which is designed as the middle ring. The third gear element designed as an outer ring comprises magnetic elements, which are aligned in a radial direction.

The agricultural vehicle may comprise a device with which torques transmitted to the front axle and the rear axle can be varied if, for example, traction loss occurs because of slippage. The device can control the relative rotary speed of individual components of the magnetic summing gearbox. The summing of electric and mechanical power can be set. Through the device, the power distribution between the front and the rear axle can be controlled in a targeted way. It is thus possible to realize a flexible power distribution that is matched to the actual load. This can take place, for example, by setting the relative rotary speeds of the magnetic summing gearbox.

With the system for dynamic adjustment of the lead of an axle, the drive power can be directed in the form of electric and mechanical power to an axle, such as the front axle. In this case, both power pathways in the magnetic summing gearbox overlap. It is also possible to have an integrated boost function, which, if necessary, directs an initial briefly elevated electric power to the front axle via the electric motor. The boost function takes place on the electric power pathway. The boost function makes it possible to add an additional fraction of the power via the electric power pathway for briefly necessary drive power.

In one embodiment of the present disclosure, the generator and at least one electric motor can be connected to at least one energy storage unit, an accumulator, or a battery. Through the connection, the generator can charge the energy storage unit and store electric energy for later use. In an operating mode in which only a small amount of electric power in the output is required, the electric power can then be directed at least partially into the energy storage unit, the accumulator, or the battery. It is available for later call-up if there is a need for power.

In one variation of the present disclosure, the system can be designed so that a recovery of the drive power takes place in a braking operation. A fraction of the power that arises during the braking operation can be converted back to electric current by the electric motor. The electric motor generates, in generator mode, a current, which is sent back to the energy storage unit. Thus, a portion of the braking power is again available at a later time.

In another embodiment, at least two electric motors are used. This enables both front wheels to be driven with different rotary speeds or different torques. Through this, one front wheel can be intentionally braked or accelerated. This method can be used to stabilize the vehicle in critical vehicle conditions.

In another embodiment, the drive power distribution to the output means of the front and the rear axle can be regulated. The distribution of the drive power additionally enables stabilization of the vehicle via the four-wheel drive. An improved tractive power of the vehicle can be achieved in the case of different substrates with alternating wheel/ground contact, for example soil, and at different upgrades.

FIG. 1 shows an agricultural vehicle 10, which in this embodiment example is designed as a tractor with a front axle 12 and a rear axle 14. Wheels are situated on the axles 12, 14, but chain or caterpillar drives can also be used instead of wheels.

FIG. 2 shows a schematic representation of a drive train system with a system 20 for dynamic adjustment of the lead.

The front axle 12 and the rear axle 14 can be driven via a mechanical power pathway. In this case, the mechanically generated power of a combustion engine 21 is transmitted by means of a manual/automatic transmission 30, a front axle differential 27, and a rear axle differential 29.

According to the present disclosure, the front wheels are additionally provided with electrically generated power. A generator 22, which is connected to the combustion engine 21, is provided for this. Through the drive power of the combustion engine 21, the generator 22 generates electric current, which is then made available for additional supply of power to the front axle 12.

In one variation of the present disclosure, the electric current can first be stored in an energy storage unit 34. However, it can also be specified that no energy storage unit 34 is accommodated, so that the electric current from 22 is utilized directly for power generation.

The electric current is directed on from generator 22 or from energy storage unit 34 to an electric motor 23. The electric motor 23 generates drive power from the electric current. According to the present disclosure, the front axle 12 can be provided with power from the electric pathway in addition to the power from the mechanical pathway.

The manual or automatic transmission 30 serves to adjust the power with respect to torque or rotary speed to the specific requirement. Through a gear stage 25, the mechanically generated power of the combustion engine 21 can be distributed to a front axle and/or rear axle drive.

The drive of the rear axle 14 in the embodiment example has a rear axle differential 29, to which the output means 28 of the rear axle is connected. Here, the output means can consist of a differential gear, a planetary gear, or an epicyclic gear, and serve to modify the rotary speed and/or the torque again before it is directed to the wheels.

The power pathway for the front axle 12 has, according to the present disclosure, a magnetic summing gearbox 31, which combines the power from the mechanical and the electric pathways and directs it to a front axle differential 27. Starting from the front axle differential 27, the power is directed further to the output means 26 of the front axle. They have the same function as the drive means 28 of the rear axle.

The electric motor 23 is combined, on its mechanical side, with the magnetic summing gearbox 31. In the magnetic summing gearbox 31, the mechanical power pathway is added to the electric power pathway and directed to the front axle 12.

Through the system 20 for dynamic adjustment of the lead, it is possible, in each case according to specific need, to additionally meter the power from the electric pathway. The electric motor 23 is controlled by a device that is not shown, so that the electric motor 23 can, through its electric output, affect the magnetic summing gearbox 31 so that power is added as needed. The summing factor can be determined in each case according to the rotary speed difference of the individual elements of the magnetic summing gearbox 31.

The device for control and/or regulation can also be used to control the generator 22, so that it can be switched on and off, in each case according to specific need.

When necessary, additional electric power can be directed to the front axle 12 through the electric power pathway with the help of the device for control and/or regulation. The electric power path does not go through the transmission 30, so that it does not become stressed by the summed power.

Through the control of the magnetic summing gear 31, a power distribution can also be achieved between the front axle 12 and the rear axle 14. Through the active control of the magnetic summing gear 31, the power can be redistributed from the front axle 12 to the rear axle 14. The power distribution between the front and rear axles 12, 14 can be controlled as needed.

Through the additional electric power, the front axle 12 may be provided with a lead. The output means of the front axle 12 in this case rotate at a higher or lower rotary speed than that of the rear axle 14. The vehicle 10 has better response behavior when cornering.

In a braking operation, a portion of the power can be converted to electric current by the electric motor 23 in generator operation and stored in energy storage unit 34.

FIG. 3 shows a schematic representation of the magnetic summing gearbox 31. The summing gearbox 31 comprises a first gear element 36, a second gear element 38, and a third gear element 40, which are magnetically coupled to each other. A transfer of a torque between the gear elements 36, 38, and 40 takes place via magnetic fields. In this case, a rotating magnetic field is generated by a rotation of a gear element 36, 38, 40, and it then exerts a force on another gear element 36, 38, 40. A transfer of a torque within the magnetic summing gearbox 31 takes place contact-free.

The first gear element 36 is designed as an inner ring. The gear element 36 is coaxially disposed with respect to a primary axis of rotation 42 of the magnetic summing gear 31. The first gear element 36, which is made as an inner ring, comprises a magnetic element 44. The magnetic element 44 in this embodiment example is made as a permanent magnet, such as a bar magnet. The magnetic element 44 is aligned at a right angle to the main axis of rotation 42. The magnetic element 44 has a north pole and a south pole. The north pole is disposed at one radial end of the magnetic element 44 and the south pole is disposed at an opposite radial end.

The second gear element 38 is designed as a middle ring and completely surrounds the first gear element 36, which is made as an inner ring, in a circumferential direction.

The second gear element 38 comprises magnetically conductive elements 46 and magnetically nonconductive elements 48. The magnetically conductive elements 46 and the magnetically nonconductive elements 48 are disposed alternately. The magnetically conductive elements 46 and the magnetically nonconductive elements 48 are firmly bonded to each other.

The third gear element 40 is made as an outer ring. The gear element 40 is radially disposed outside of the second gear element 38, which is made as a middle ring. The third gear element 40 comprises magnetic elements 50, 52. The magnetic elements 50, 52 are firmly integrated into the gear element 40, which is made as an outer ring.

The magnetic elements 50, 52 are distributed over the entire 360 degrees of the ring-shaped gear element 40 and are aligned in a radial direction. A north pole and a south pole of a magnetic element 50, 52 each lies on an imaginary axis that runs radially outward from the main axis of rotation.

A polarization of two adjacent magnetic elements 50, 52 of the third gear element 40 is thus reversed. The north pole of one magnetic element 50 is aligned radially inward in the direction of the main axis of rotation, and the north pole of the magnetic element 52 that is adjacent in the circumferential direction is oppositely aligned radially outward from the main axis of rotation.

Equivalently then, the south pole of one magnetic element 50 is oppositely aligned radially outward from the main axis of rotation and the south pole of the adjacent magnetic element 52 in the circumferential direction is aligned radially inwardly in the direction of the main axis of rotation. All magnetic elements 50, 52 of the third gear element 40 are disposed with opposite polarization to the adjacent magnetic elements 50, 52.

The magnetic elements 50, 52 of the third gear element 40, which is made as an outer ring, can be made as permanent magnets. In this variation, the magnetic summing gear 31 has a fixed transmission ratio.

In a variation of the present disclosure, which is not represented in the figures, the magnetic elements 50, 52 are made as controllable magnetic coils, so that the magnetic summing gear 31 can form a variable transmission ratio through a special control system based on one or more factors affecting driving behavior described herein, and thus a continuously variable variation of the lead is possible.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A system for dynamic adjustment of a lead of an axle of a vehicle having a combustion engine for all-wheel drive of a front axle and a rear axle, the system comprising:
   an electric motor; and
   a summing gear configured to sum a drive power of the combustion engine and the electric motor;
   wherein the summing gear has at least two gear elements, the at least two gear elements being magnetically coupled; and
   wherein the summing gear comprises a transmission ratio, and wherein the transmission ratio is configured for control by a device of the vehicle based on at least one driving behavior factor.

2. The system of claim 1, wherein the summing gear comprises:
   a first gear element configured for connection to the combustion engine;
   a second gear element configured for connection to the electric motor; and
   a third gear element configured as an output element.

3. The system of claim 2, wherein the third gear element is configured for connection to a front axle differential.

4. The system of claim 2, wherein one of the first gear element, the second gear element, and the third gear element is an inner ring, one of the first gear element, the second gear element, and the third gear element is an outer ring, and one of the first gear element, the second gear element, and the third gear element is a middle ring; and
   wherein each of the first gear element, the second gear element, and the third gear element is magnetically coupled to at least one other of the first gear element, the second gear element, and the third gear element.

5. The system of claim 4, wherein the electric motor is disposed immediately around the outer ring.

6. The system of claim 4, wherein the outer ring comprises an input wheel of a differential gear.

7. The system of claim 4, wherein the outer ring comprises magnetic elements.

8. The system of claim 4, wherein the outer ring generates a magnetic field with coils.

9. The system of claim 1, wherein the system generates energy in an electric generator and directs the energy to the electric motor without intermediate storage.

10. The system of claim 1, wherein the device is configured to evaluate a signal that represents a driving mode of the vehicle.

11. A method of dynamically adjusting a lead of an axle of a vehicle having a combustion engine for all-wheel drive of a front axle and a rear axle, the method comprising:
   providing an electric motor and a summing gear having at least two gear elements;
   magnetically coupling the at least two gear elements of the summing gear;
   summing a drive power of the combustion engine and the electric motor with the summing gear; and
   controlling a transmission ratio of the summing gear with a vehicle device based on at least one driving behavior factor.

12. The method of claim 11, further comprising:
   connecting a first gear element of the at least two gear elements of the summing gear to the combustion engine; and
   connecting a second gear element of the at least two gear elements of the summing gear to the electric motor.

13. The method of claim 12, further comprising:
   connecting a third gear element of the at least two gear elements of the summing gear to a front axle differential.

14. The method of claim 13, wherein each of the first gear element, the second gear element, and the third gear element comprises one of an inner ring, an outer ring, and a middle ring.

15. The method of claim 14, further comprising:
   generating a magnetic field with coils with the outer ring.

16. The method of claim 11, further comprising:
   generating energy in an electric generator; and
   directing the energy to the electric motor without intermediate storage.

17. The method of claim 11, further comprising:
   evaluating a signal representing a driving mode of the vehicle by the vehicle device.

18. A vehicle comprising:
   a front axle;
   a rear axle;
   a combustion engine for all-wheel drive of the front axle and the rear axle;
   an electric motor; and
   a summing gear configured to sum a drive power of the combustion engine and the electric motor;
   wherein the summing gear has at least two magnetically coupled gear elements for dynamic adjustment of a lead of one of the front axle and the rear axle of the vehicle; and
   wherein the summing gear comprises a transmission ratio, and wherein the transmission ratio is configured for control by a device of the vehicle based on at least one driving behavior factor.

19. The vehicle of claim 18, wherein the summing gear comprises:
   a first gear element configured for connection to the combustion engine;
   a second gear element configured for connection to the electric motor; and
   a third gear element configured as an output element and configured for connection to a front axle differential;
   wherein one of the first gear element, the second gear element, and the third gear element is an inner ring, one of the first gear element, the second gear element, and the third gear element is an outer ring, and one of the first gear element, the second gear element, and the third gear element is a middle ring; and
   wherein each of the first gear element, the second gear element, and the third gear element is magnetically coupled to at least one other of the first gear element, the second gear element, and the third gear element.

20. The vehicle of claim 18, wherein the device is configured to evaluate a signal that represents a driving mode of the vehicle.

* * * * *